United States Patent [19]

Smith

[11] Patent Number: 5,745,266
[45] Date of Patent: Apr. 28, 1998

[54] QUARTER-WAVE FILM FOR BRIGHTNESS ENHANCEMENT OF HOLOGRAPHIC THIN TAILLAMP

[75] Inventor: Ronald T. Smith, Corona Del Mar, Calif.

[73] Assignee: Raytheon Company, Lexington, Mass.

[21] Appl. No.: 665,278

[22] Filed: Oct. 2, 1996

[51] Int. Cl.⁶ .................................................. G03H 1/00
[52] U.S. Cl. .................. 359/34; 359/13; 359/15; 385/901
[58] Field of Search ................ 359/13, 15, 34; 385/11, 129, 901

[56] References Cited

U.S. PATENT DOCUMENTS

| | | | |
|---|---|---|---|
| 5,341,230 | 8/1994 | Smith | 359/34 |
| 5,465,311 | 11/1995 | Caulfield et al. | 359/34 |
| 5,515,184 | 5/1996 | Caulfield et al. | 359/34 |
| 5,650,865 | 7/1997 | Smith | 359/34 |

Primary Examiner—Paul M. Dzierzynski
Assistant Examiner—Darren E. Schuberg
Attorney, Agent, or Firm—Leonard A. Alkov; Glenn H. Lenzen, Jr.

[57] ABSTRACT

A holographic thin rear exterior lamp for a vehicle including a light pipe (11) having first and second opposing surfaces (11a, 11b), a rear exterior lamp hologram (13, 113) attached to one of the first and second surfaces of the light pipe, a polarization rotating retarder film (16, 116) attached to one of the first and second opposing surfaces oppositely from the rear exterior lamp hologram, a light source (17, 19) for providing a substantially collimated beam, a transmission hologram (15) disposed on one of the first and second surfaces of the light pipe for coupling the substantially collimated beam into the light pipe such that a portion of the substantially collimated light propagates by total internal reflection within the light pipe, the rear exterior lamp hologram and the polarization rotating retarder film. The polarization rotating retarder film is configured to impart a substantially halfwave retardance to internally reflected light that passes twice therethrough.

9 Claims, 2 Drawing Sheets

QUARTER-WAVE FILM FOR BRIGHTNESS ENHANCEMENT OF HOLOGRAPHIC THIN TAILLAMP

BACKGROUND OF THE INVENTION

The disclosed invention is directed generally to a holographic rear exterior lamps for vehicles, and more particularly to a holographic thin rear exterior lamp for vehicles.

Vehicles such as automobiles are required to have rear exterior lamps which function as tail lamps, stop lamps and turn signal lamps. Rear exterior lamps for vehicles are conventionally comprised of an incandescent bulb, a reflector, a suitably colored lens, and a housing.

Considerations with conventional rear exterior lamps include large size, heavy weight, complexity, and the need to configure the rear structure of a vehicle to accommodate the thickness of the rear exterior lamp.

SUMMARY OF THE INVENTION

It would therefore be an advantage to provide a rear exterior lamp for a vehicle that is thin, compact, and of light weight.

The foregoing and other advantages are provided by the invention in a holographic rear exterior lamp assembly that includes a planar light pipe having first and second opposing surfaces; a rear exterior lamp hologram attached to one of the first and second opposing surfaces of the light pipe; a polarization rotating retarder film attached to one of the first and second opposing surfaces oppositely from the rear exterior lamp hologram; a light source and reflector for providing a reconstruction beam; a transmission hologram disposed on one of the first and second surfaces of the light pipe for coupling the reconstruction beam into the light pipe such that a portion of the reconstruction beam propagates by total internal reflection within the light pipe, the exterior lamp hologram, and the polarization rotating retarder film, whereby the rear exterior lamp hologram diffracts a portion of the totally internally reflected light to provide rear exterior lamp illumination. The polarization rotating retarder film is configured to impart a substantially halfwave retardance to internally reflected light that passes twice therethrough.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
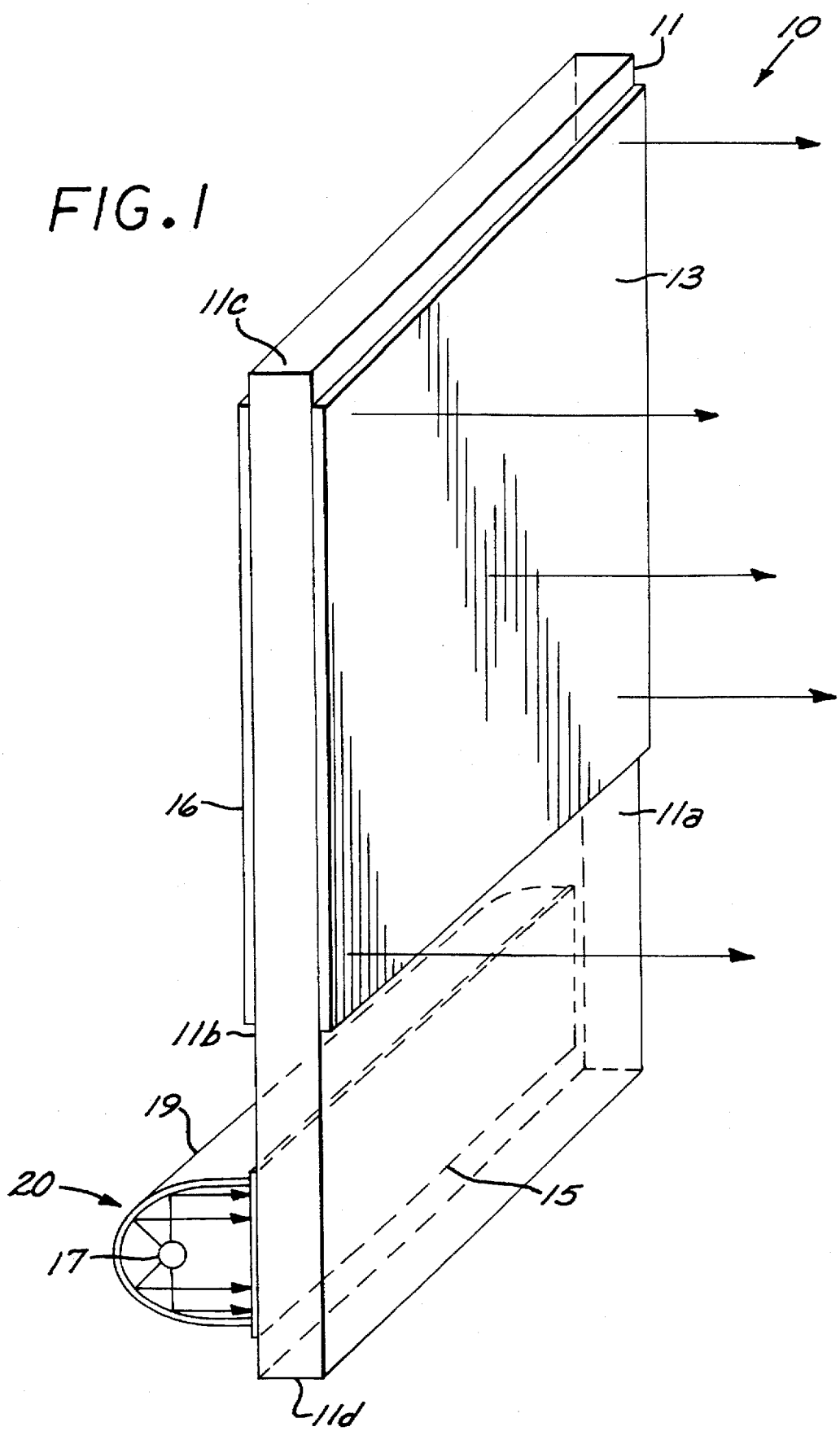
FIG. 1 is a schematic perspective view of a holographic rear exterior vehicle lamp in accordance with the invention.

In the following detailed description and in the several figures of the drawing, like elements are identified with like reference numerals.

Figure 2:
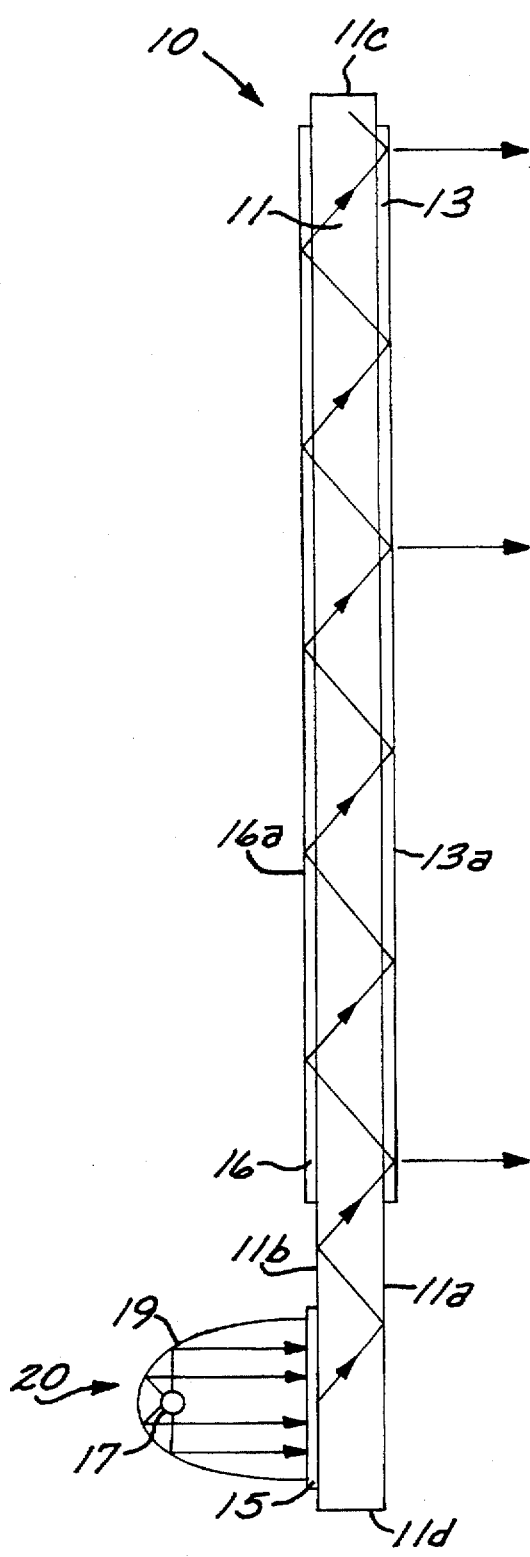
FIG. 2 is a schematic side elevational view of the holographic rear exterior vehicle lamp of FIG. 1.

Referring now to FIGS. 1 and 2, schematically set forth therein are a perspective view and side elevational view of a holographic rear exterior vehicle lamp 10 in accordance with the invention. The holographic rear exterior lamp includes a thin, flat transparent light pipe 11 having a first planar surface 11a and a second planar surface 11b that is opposite and parallel to the first planar surface 11a. A narrow top surface 11c extends between adjacent top edges of the first planar surface 11a and the second planar surface 11b, while a narrow bottom surface 11d extends between adjacent bottom edges of the first planar surface 11a and the second planar surface 11b. A rear exterior lamp hologram 13 is laminarly attached in an index matching manner to the first planar surface 11a adjacent the narrow top surface 11c of the light pipe 11, and extends downwardly, for example past the vertical center between the narrow top surface 11c of the light pipe 11 and the narrow bottom surface 11d of the light pipe 11.

The holographic rear exterior lamp further includes an input coupling volume transmission hologram 15 that is laminarly attached in an index matching manner to the second planar surface 11b adjacent the lower edge of the light pipe 11. A polarization rotating retarder layer or film 16 is laminarly attached in an index matching manner to substantially most of the remainder of the planar surface 11b that is not occupied by the input coupling volume transmission hologram 15. The polarization rotating retarder film 16 is configured to impart a substantially halfwave retardance to light that passes through the film twice as a result of internal reflection at a retarder/air interface 16a.

The input coupling hologram 15 is illuminated with a substantially collimated reconstruction beam that is provided by a light source 20 that is comprised of a linear neon lamp 17 and an optical concentrator 19. The linear neon lamp 17 is suitably connected to an appropriate electrical circuit of the automobile so as to be appropriately energized in accordance with its intended function. The optical concentrator 19 includes a reflective surface having an acylindrical vertical cross section that is constant across the lateral extent of the reflective surface, and thus the substantially collimated reconstruction beam provided by the light source 20 is more particularly vertically collimated.

The input coupling hologram 15 diffracts the reconstruction illumination incident thereon into the light pipe at an upwardly directed angle that is appropriate for total internal reflection within the light pipe 11 and the polarization rotating retarder film 16, such that a portion of the light that is diffracted by the input coupling hologram 15 propagates upwardly within light pipe 11. The polarization rotating retarder film 16 is preferably positioned such that light that is incident thereon has been reflected at a hologram/air interface 13a.

As indicated previously, the polarization rotating retarder film 16 functions to impart a substantially halfwave retardance on light that passes through the film twice as a result of internal reflection at the retarder/air interface 16a. Thus, P-polarized light that enters the retarder film 16 from the light pipe emerges as S-polarized light from the retarder film 16 after reflection at the retarder/air interface 16a. Similarly, S-polarized light that enters the retarder film 16 from the light pipe emerges as P-polarized light from the retarder film 16 after reflection at the retarder/air interface 16a. Since S-polarized light is strongly diffracted by the lamp hologram 13 on its first encounter with the lamp hologram 13, the light that is incident on the polarization rotating retarder film 16 is predominantly P-polarized. The retarder film 16 converts the predominantly P-polarized light to predominantly S-polarized light which is strongly diffracted by the lamp hologram 13. Thus, the efficiency of the lamp hologram 13 as to second and subsequent encounters of light is greater than it would have been without the polarization rotating retarder film 16.

In its simplest case, the halfwave retardance imparted by the polarization rotating retarder film 16 is the sum of the retardance of the first pass through the film 16 plus the retardance of the second pass through the film 16, wherein the polarization rotating retarder film 16 is implemented as a quarterwave retarder so as to impart on each pass therethrough one-half of the retardance imparted by two passes therethrough. For this to be completely accurate requires that no additional phase retardance is added by total internal reflection at the retarder/air interface 16a. However, in general, total internal reflection does cause an additional phase retardance. This retardance varies from 0 degrees at the critical angle (about 41 degrees for a typical case where the high index medium has an index of ≈1.5 and the low index medium is air with an index of 1) to a maximum of slightly greater than 45 degrees (⅛ wave) retardance around 50 degrees to 60 degrees, and then decreasing to zero retardance at 90 degrees incidence. The effect of this additional phase retardance is to cause the output beam to not be exactly linearly polarized in S or P polarization, but to be somewhat elliptically polarized.

Therefore, for ideal halfwave performance, the incidence angle of the totally internally reflected light should be either close to the critical angle (in the range of 40 to 45 degrees) or greater than 80 degrees. However, even in the worst case situation where the incident beam has an incidence angle in the range of 50 to 60 degrees, as to P-polarized incident light, a substantial portion (greater than 85%) of the elliptically polarized output resulting from P-polarized incident light will be in the desired S-polarized state. The result is substantially greater diffraction of the beam on its next encounter with the rear exterior lamp hologram 13 than would be achieved otherwise without the polarization rotating retarder film 16.

The light provided by the linear neon light is of an appropriate red color, and the rear exterior lamp hologram 13 is particularly configured to most efficiently diffract the red light that is incident thereon at the angle at which the internally reflected light is incident on the first surface 11a of the light pipe 11, and to diffract such light into a predetermined angular region as rear exterior lamp illumination. The internally reflected light that is incident on the first surface 11a of the light pipe 11 therefore comprises reconstruction illumination for the rear exterior lamp hologram 13 which gradually diffracts the internally reflected light as it propagates in the light pipe 11.

Depending on implementation, the rear exterior lamp hologram 13 is configured to diffract light away from the first planar surface 11a of the transparent light pipe 11, as indicated by the arrows in FIG. 1, or through the light pipe 11 such that the diffracted light exits the second planar surface 11b of the transparent light pipe.

As a result of the use of a linear light source 20 and a light pipe 11 for providing light to a rear exterior lamp hologram 13, the disclosed holographic rear exterior lamp can be made relatively thin. For example, the light pipe can have a thickness of approximately one-quarter inch, and the entire rear exterior lamp including the light source can have a thickness of less than one inch.

Figure 3:
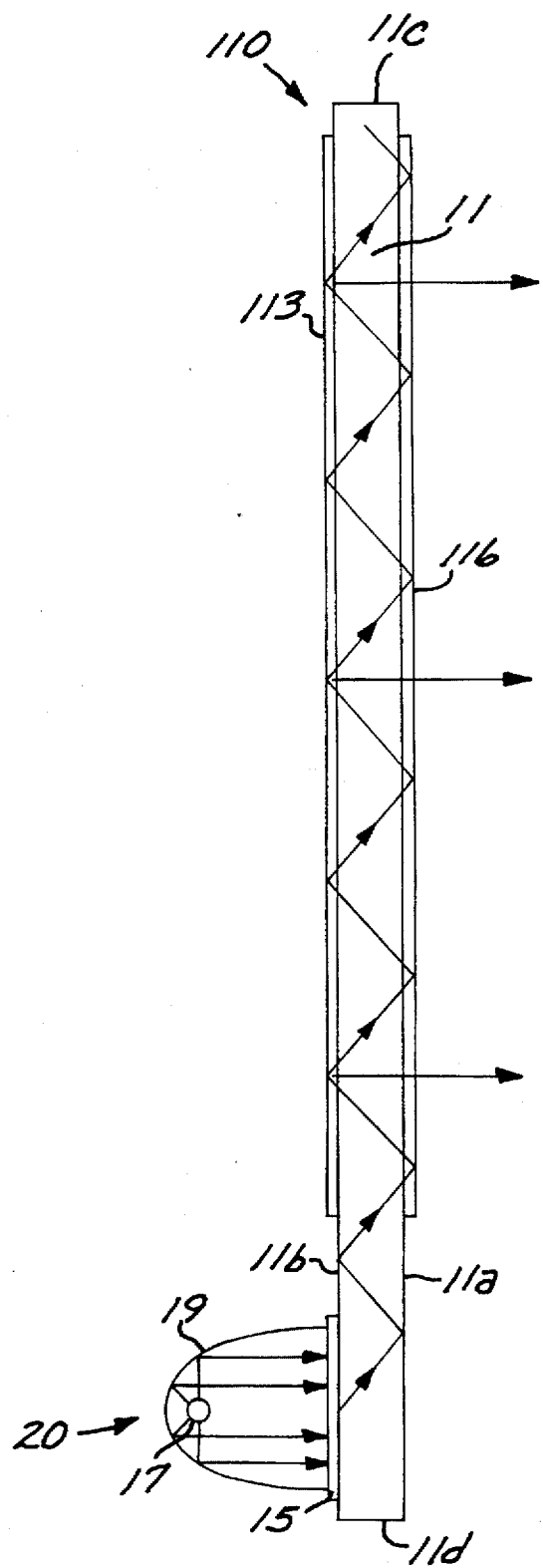
FIG. 3 is a schematic side elevational view of a further holographic rear exterior vehicle lamp in accordance with the invention.

Referring now to FIG. 3, schematically set forth therein is side elevational view of a holographic rear exterior vehicle lamp 110 in accordance with the invention which is similar to the holographic rear exterior vehicle lamp 10 of FIGS. 1 and 2, except that a rear exterior lamp hologram 113 is laminarly attached in an index matching manner to the same second planar surface 11b of the light pipe 11 to which the input coupling hologram 15 is attached, while a polarization rotating retarder layer or film 116 is laminarly attached in an index matching manner to the first planar surface 11a of the light pipe 11. The rear exterior lamp hologram 113 is configured to diffract light away from the second planar surface 11b of the transparent light pipe 11, or through the light pipe 11 such that the diffracted light exits the first planar surface 11a of the transparent light pipe 11.

While a linear neon lamp 17 and an optical concentrator 19 are disclosed by way of illustrative example as a light source for the holographic rear exterior lamp, it should be appreciated that other sources that provide vertically collimated light can be utilized. For example, an array of highly collimated, suitably colored light emitting diodes could be utilized. A linear array of incandescent bulbs and a colored cylindrical lens could also be utilized.

The foregoing has thus been a disclosure of a holographic rear exterior lamp that is thin, compact and of light weight, and which advantageously does not require the mounting depth and complexity of a conventional rear exterior lamp. The disclosed holographic rear exterior lamp further provides the advantage of faster turn-on and longer lamp life, since a neon lamp turns on faster than an incandescent bulb and has a longer lifetime than an incandescent bulb.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic rear exterior lamp for a vehicle, comprising:

a light pipe having first and second opposing surfaces;

a rear exterior lamp hologram attached to one of said first and second opposing surfaces of said light pipe;

a polarization rotating retarder film attached to one of said first and second opposing surfaces oppositely from said rear exterior lamp hologram;

means for providing a reconstruction beam;

holographic coupling means attached to one of said first and second opposing surfaces of said light pipe for coupling said reconstruction beam into said light pipe such that a portion of said reconstruction beam propagates as internally reflected light pursuant to internal reflection within said light pipe, said rear exterior lamp hologram and said polarization rotating retarder film;

said polarization rotating retarder film configured to impart a substantially halfwave retardance to internally reflected light that passes twice therethrough;

whereby said rear exterior lamp hologram diffracts a portion of said internally reflected light to provide rear exterior lamp illumination.

2. The holographic rear exterior lamp of claim 1 wherein said holographic coupling means comprises a transmission hologram.

3. The holographic rear exterior lamp of claim 1 wherein said means for providing a reconstruction beam comprises a cylindrical light source and an acylindrical reflector.

4. The holographic rear exterior lamp of claim 1 wherein said first and second opposing surfaces comprise first and second opposing planar surfaces, and wherein said holographic coupling means comprises a transmission hologram disposed adjacent an edge of one of said first and second opposing planar surfaces.

5. A holographic rear exterior lamp for a vehicle, comprising:

a light pipe having first and second opposing surfaces;

a rear exterior lamp hologram attached to one of said first and second surfaces of said light pipe;

a polarization rotating retarder film attached to one of said first and second opposing surfaces oppositely from said rear exterior lamp hologram;

means for coupling light into said light pipe such that a portion of said light propagates as internally reflected light pursuant to internal reflection within said light pipe, said rear exterior lamp hologram and said polarization rotating retarder film;

said polarization rotating retarder film configured to impart a substantially halfwave retardance to internally reflected light that passes twice therethrough;

whereby said rear exterior lamp hologram diffracts a portion of said internally reflected light to provide rear exterior lamp illumination.

6. The holographic rear exterior lamp of claim 5 wherein said means for coupling includes a transmission hologram disposed on one of said first and second surfaces of said light pipe.

7. The holographic rear exterior lamp of claim 6 wherein said means for coupling further includes:

a cylindrical light source for providing a cylindrical light source output;

an acylindrical reflector responsive to said cylindrical light output for providing a reflector output that illuminates said transmission hologram.

8. The holographic rear exterior lamp of claim 5 wherein said first and second opposing surfaces comprise first and second opposing planar surfaces, and wherein said coupling means includes a transmission hologram disposed adjacent an edge of one of said first and second opposing planar surfaces.

9. The holographic rear exterior lamp of claim 8 wherein said means for coupling further includes:

a cylindrical light source for providing a cylindrical light source output;

an acylindrical reflector responsive to said cylindrical light output for providing a reflector output that illuminates said transmission hologram.

* * * * *